(12) United States Patent
Liang et al.

(10) Patent No.: US 12,498,882 B2
(45) Date of Patent: Dec. 16, 2025

(54) METHOD FOR READING DATA FROM FLASH MEMORY AND RELATED MEMORY CONTROLLER AND STORAGE SYSTEM THEREOF

(71) Applicant: Silicon Motion, Inc., Hsinchu County (TW)

(72) Inventors: Chia-Chi Liang, Hsinchu County (TW); Cheng-Yu Tsai, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 385 days.

(21) Appl. No.: 18/120,973

(22) Filed: Mar. 13, 2023

(65) Prior Publication Data
US 2024/0311044 A1   Sep. 19, 2024

(51) Int. Cl.
*G06F 3/06* (2006.01)
(52) U.S. Cl.
CPC .......... *G06F 3/0656* (2013.01); *G06F 3/0622* (2013.01); *G06F 3/0679* (2013.01)
(58) Field of Classification Search
None
See application file for complete search history.

(56) References Cited

U.S. PATENT DOCUMENTS

| 2017/0052736 A1* | 2/2017 | Butt ..................... G06F 3/0619 |
| 2019/0164615 A1* | 5/2019 | Kim ..................... G06F 3/0659 |
| 2022/0276963 A1 | 9/2022 | Narsale |
| 2022/0300208 A1 | 9/2022 | He |

FOREIGN PATENT DOCUMENTS

| TW | 202018514 A | 5/2020 |
| TW | 202249018 A | 12/2022 |
| TW | 202301330 A | 1/2023 |
| TW | 202303379 A | 1/2023 |

* cited by examiner

*Primary Examiner* — Michael Alsip
(74) *Attorney, Agent, or Firm* — Winston Hsu

(57) ABSTRACT

A method for reading data from a flash memory is provided. The method comprises: determining whether a host device is requesting a sequential read access to the flash memory; prior to receiving a first host read command issued by the host device, performing a read-ahead operation to read data from the flash memory according to a read-ahead start logical block address (LBA) if the host device is requesting the sequential read access to the flash memory; and storing the data that is read through the read-ahead operation in a read-ahead buffer; and in response to receiving a first host read command issued by the host device, sending a portion or all of data that is read through the read-ahead operation to the host device if a start LBA of the first host read command corresponds to one of start LBAs of data that is stored in the read-ahead buffer.

11 Claims, 8 Drawing Sheets

METHOD FOR READING DATA FROM FLASH MEMORY AND RELATED MEMORY CONTROLLER AND STORAGE SYSTEM THEREOF

BACKGROUND OF THE INVENTION

1. Field of the Invention

The present invention relates to flash memory, and more particularly, to a method for reading data from flash memory and a related memory controller and a storage system thereof.

2. Description of the Prior Art

When reading data from a flash memory, interleaving architecture may be relied upon to increase read performance. For example, each channel of a multi-channel memory can be accessed in parallel to respond to multiple host read commands, However, a depth of a command queue for queuing the host read commands may be low in some conditions, which limit a controller not to able to simultaneously handle as many commands as possible, such that the interleaving architecture may not be fully utilized. In view of this, there is a need to provide an innovative mechanism of handling host read commands.

SUMMARY OF THE INVENTION

With this in mind, it is one object of the present invention to provide a mechanism of predicting and handling sequential read access. Embodiments of the present invention would determine whether a host device is requesting a sequential read access to the flash memory. If so, a memory controller would perform a read-ahead operation to read data that is likely to be requested later on and store the read data in a read-ahead buffer. Afterward, the memory controller determines whether logical addresses requested by a new host read command matches those of data in the read-ahead buffer. If there is a hit, the memory controller would complete the new host read command by sending data from the read-ahead buffer to the host device instead of actually reading the flash memory.

According to one embodiment, a method for reading data from a flash memory is provided. The method comprises: determining whether a host device is requesting a sequential read access to the flash memory; prior to receiving a first host read command issued by the host device, performing a read-ahead operation to read data from the flash memory according to a read-ahead start logical block address (LBA) if the host device is requesting the sequential read access to the flash memory; and storing the data that is read through the read-ahead operation in a read-ahead buffer; and in response to receiving the first host read command issued by the host device, sending a portion or all of data that is read through the read-ahead operation to the host device if a start LBA of the first host read command corresponds to one of start LBAs of data that is stored in the read-ahead buffer.

According to one embodiment of the present invention, a memory controller for use in a flash memory to control operations of the flash memory is provided. The memory controller comprises: a storage unit and a processing unit. The storage unit is configured to store information. The processing unit is configured to execute program codes and information stored in the flash memory or in the storage unit so as to perform an operation of determining whether a host device is requesting a sequential read access to the flash memory; prior to receiving a first host read command issued by the host device, performing a read-ahead operation to read data from the flash memory according to a read-ahead start logical block address (LBA) if the host device is requesting the sequential read access to the flash memory; and storing the data that is read through the read-ahead operation in a read-ahead buffer; and in response to receiving the first host read command issued by the host device, sending a portion or all of data that is read through the read-ahead operation to the host device if a start LBA of the first host read command corresponds to one of start LBAs of data that is stored in the read-ahead buffer.

According to one embodiment of the present invention, a storage device is provided. The storage device comprises: a flash memory; and a flash memory controller. The memory controller is configured to control the flash memory. The memory controller comprising: a storage unit and a processing unit. The storage unit is configured to store information. The processing unit is configured to execute program codes and information stored in the flash memory or in the storage unit so as to perform an operation of: determining whether a host device is requesting a sequential read access to the flash memory; prior to receiving a first host read command issued by the host device, performing a read-ahead operation to read data from the flash memory according to a read-ahead start logical block address (LBA) if the host device is requesting the sequential read access to the flash memory; and storing the data that is read through the read-ahead operation in a read-ahead buffer; and in response to receiving the first host read command issued by the host device, sending a portion or all of data that is read through the read-ahead operation to the host device if a start LBA of the first host read command corresponds to one of start LBAs of data that is stored in the read-ahead buffer.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
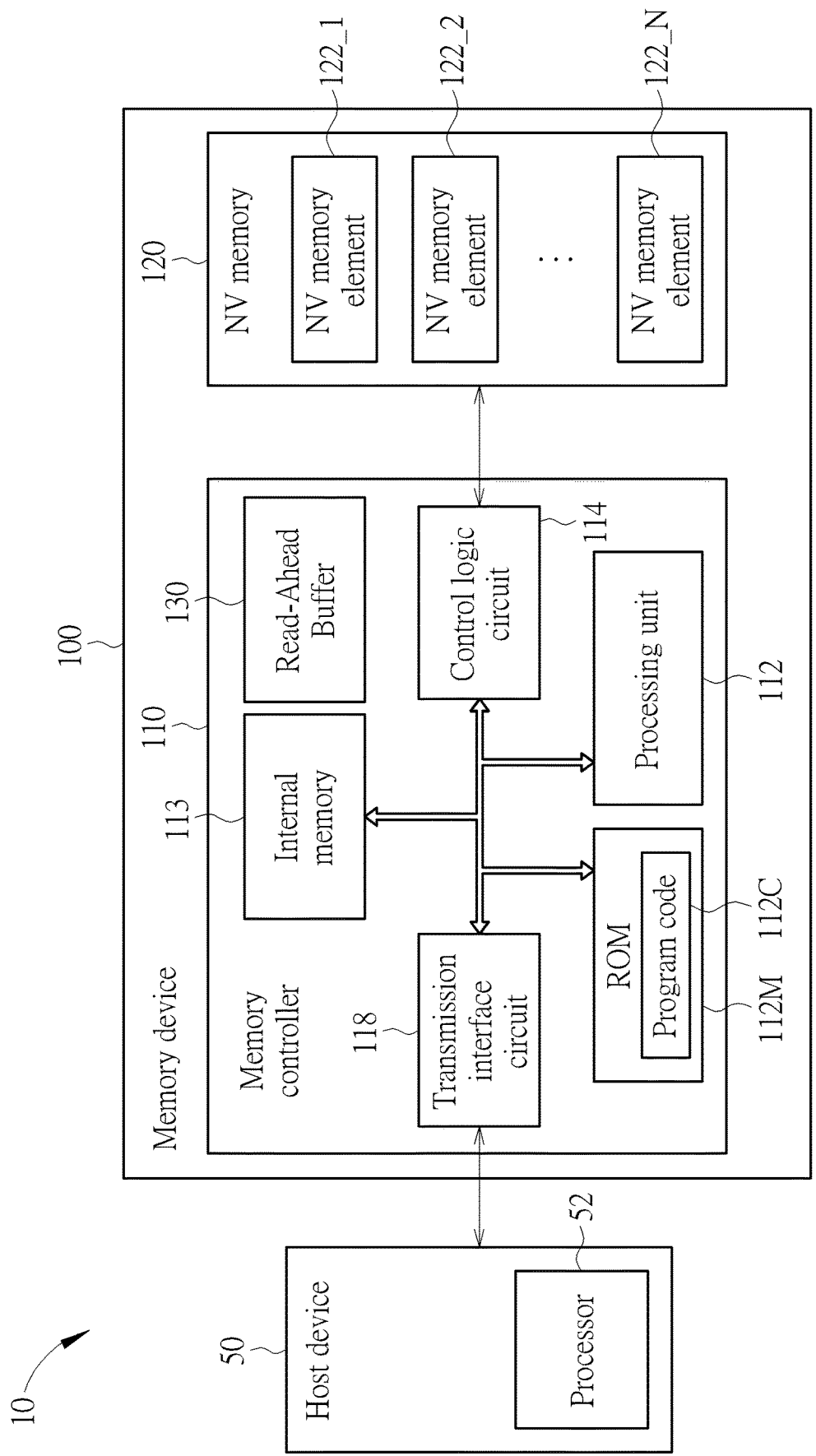
FIG. 1 illustrates a schematic diagram of a storage device including a memory controller according to one embodiment of the present invention.

FIG. 1 is a diagram illustrating an electronic device 10 according to an embodiment of the present invention, where the electronic device 10 comprises a host device 50 and a storage device 100. The host device 50 may comprise: at least one processor 52 configured to control operations of the host device 50. Examples of the host device 50 may include, but are not limited to: a smartphone, a tablet computer, a wearable device, a personal computer such as a desktop computer and a laptop computer, an imaging device such as a digital still camera or a video camera a game console, a car navigation system, a printer, a scanner or a server system. Examples of the storage device 100 may include, but are not limited to: a portable memory device (such as a memory card conforming to SD/MMC, CF, MS, XD or UFS specifications), a solid state drive (SSD) and various embedded storage device (such as an embedded storage device conforming to UFS or EMMC specifications).

According to various embodiments, the storage device 100 may comprise a controller such as a memory controller 110, and may further comprise a non-volatile (NV) memory 120. The NV memory 120 is configured to store information. The NV memory 120 may comprise at least one NV memory element (e.g. one or more NV memory elements), such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or may comprise memory cells having a three-dimensional structure.

As shown in FIG. 1, the memory controller 110 may comprise a processing circuit such as a microprocessor 112, a storage component such as a read-only memory (ROM) 112M, an internal memory 113, a control logic circuit 114, a read-ahead buffer 130, a transmission interface circuit 118, where at least one portion (e.g. a portion or all) of these components may be coupled to one another through a bus. The internal memory 113 is implemented by a random access memory (RAM), for example, the internal memory 113 may be a static RAM (SRAM) and/or dynamic RAM (DRAM). The internal memory 113 may be configured to provide internal storage space to the memory controller 110, for example, temporarily storing information, such as, parameters, commands, data, addresses, or mapping table. In addition, the ROM 112M of this embodiment is configured to store a program code 112C, and the microprocessor 112 is configured to execute the program code 112C to control access of the NV memory 120. Alternatively, the program code 112C may be stored in the NV memory 120.

The memory controller 110 controls reading, writing and erasing of the NV memory 120 through a control logic circuit 114. In addition, the memory controller 110 could perform writing of user data based on host commands from the host device 50 and writing of valid data which is read from the NV memory 120 by the garbage collection and or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host device 50 according to the specific communications specification.

Typically, the host device 50 may access the memory device 100, indirectly, through transmitting host read/write commands and corresponding logic addresses to the memory controller 110. The memory controller 110 receives the host commands and the logic addresses, and translates the host commands to memory operation commands, and further controls the NV memory 120 with the memory operation commands to perform read, write or erase operations upon memory units or data pages having physical addresses within the NV memory 120, where the physical addresses corresponds to the logic addresses. When the memory controller 110 performs an erase operation on any NV memory element $122\_k$ within the plurality of NV memory elements 122_1-122_N, at least one block of the NV memory element $122\_k$ may be erased. In addition, each block of the NV memory element $122\_k$ may comprise multiple pages, and an access operation (e.g. read or write) may be performed on one or more pages.

In one embodiment, each one of NV memory elements 122_1-122_N could be a NV memory die (or chip). There is control circuitry on each one of NV memory dies 122_1-122_N for executing memory operation commands issued by the memory controller 110. In addition, each of the NV memory dies 122_1-122_N could comprise a plurality of planes. Each plane may comprise a number of blocks of memory cells and associated row and column control circuitry. The memory cells in each plane may be arranged in a 2D or 3D memory structure. Multiple operations may be performed in parallel (i.e., simultaneously) on memory blocks of different planes according to a multi-plane (e.g. read, program, erase) operation. The multi-plane operation may perform various processing operations on different planes simultaneously.

In one embodiment, the memory controller 110 would perform a read-ahead operation on the NV memory 120 to improve efficiency of sequential read access. The memory controller 110 would determine whether host read commands that are issued by the host device 50 requesting to read data at continuous logical block addresses (LBAs) from the NV memory 120. If so, the read-ahead operation would be started to read the NV memory 120 according to predictive start LBAs to acquired read-ahead data that is likely to be requested by the host device 50 later on.

The acquired read-ahead data will be stored in the read-ahead buffer 130. The read-ahead buffer 130 will be provided by allocating a part of system RAM of the host device 50 or being a part of internal memory 113. In one embodiment, a size of the read-ahead buffer 130 is associated with a data amount of data that can be acquired from one of the NV memory dies 122_1-122_N through one multi-plane read operation. For example, if each of NV memory dies 122_1-122_N has four planes, the data amount that can be acquired from one of the NV memory dies 122_1-122_N by one multi-plane read operation could be 64K bytes (4*16K bytes). Therefore, a minimum size of the read-ahead buffer 130 could 2*64K bytes such that the read-ahead buffer 130 could have sizes sufficient for storing new data acquired by the read-ahead operation and data pending for returning to the host device 50 at the same time. In one embodiment, a maximum size of the read-ahead buffer 130 is associated with the number of interleaving sets of the memory device 100. For example, if the memory device 100 has 4-channel and 1-way interleaving architecture, the data amount of data that can be acquired from four channels through 4 multi-plane read operations simultaneously could be 256K bytes (4*64K bytes), which can be the maximum size of the read-ahead buffer 130.

Figure 2:
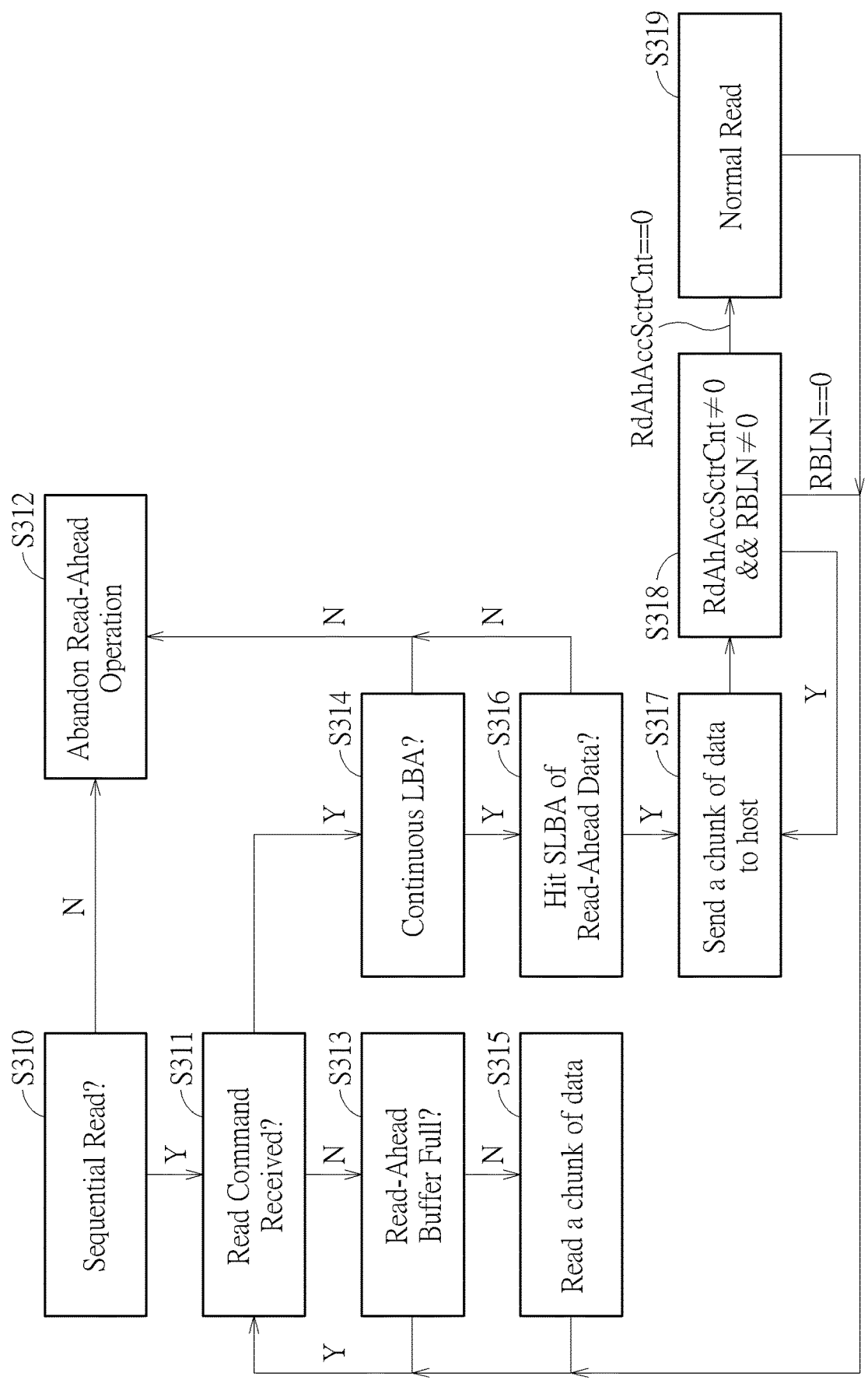
FIG. 2 illustrates a flow of reading data from a flash memory device according to on embodiment of the present invention

Please refer to FIG. 2, which illustrates a flow of a method of reading data from a flash memory device according to on embodiment of the present invention. The flow starts at step S310, where it is determined whether the host device 50 is requesting a sequential read access to the NV memory 120. Specifically, the memory controller 110 needs to check whether a predetermined number of continuous host read commands issued by the host device 40 correspond to a sequential read access to the NV flash memory 120. For example, the memory controller 110 may need to check whether three continuous host read commands issued by the host device 40 correspond to a sequential read access. That is, if a start LBA of a second host command is identical to a summation of a start LBA (i.e., SLBA) of a first host read command and a number of logical blocks (i.e., NLBN) that are requested to be read by the first host read command, a start LBA of a third host read command is identical to a summation of the start LBA of the second host read command and the NLBN that are requested to be read by the second host read command, a start LBA of a fourth host read command is identical to a summation of the start LBA of the third host read command and the NLBN that are requested to be read by the third host read command, it will be confirmed the host device 50 is requesting a sequential read access to the NV memory 120; otherwise, the memory controller 110 would determine the host device 50 is not requesting a sequential read access.

If the check result of step S310 is yes, the flow proceeds to step S311; otherwise, the flow goes to step S312, abandoning the read-ahead operation. At step S311, it is checked whether a new host read command that is issued by the host device 50 is received. If the determination result of step S311 is yes, the flow goes to S314; if no, the flow goes to step S313.

At step S313, since no new host read command is issued by the host device 50, it is checked whether the read-head buffer 130 is full. If the read-head buffer 130 is not full, the flow goes to step S315, where the read-ahead operation would be executed, thereby acquiring read-ahead data and storing the acquired read-head data to the read-ahead buffer 130. Preferably, in the read-ahead operation, data would be read from the NV memory 120 according to a read-ahead start LBA, which is typically identical to a summation of a start LBA of a previous host read command and a number of logical blocks that are requested to be read by the previous host read command. However, in some situations the read-ahead start LBA would be identical to a summation of a start LBA of a previous read-ahead operation and a number of logical blocks that are read by a previous read-ahead operation.

In a preferred embodiment, in the read-ahead operation, each time a chunk of data would be acquired from the NV memory 120 to the read-ahead buffer 130. In a case where each of NV memory dies (or chips) 122_1-122_N has four planes, a size of the chunk of data would be 64K bytes, which is the data amount read through a multi-plane read operation. On the other hand, if the read-head buffer 130 is full, the flow goes back to step S311, waiting for a new host read command.

At step S314, a new host read command that is issued by the host device 50 is received by the memory controller 110. Thus, a start LBA of the new host read command will be checked whether it is continuous to the previous host read command (i.e., by checking whether the start LBA of the new host read command is identical to a summation of a start LBA of a previous host read command and a number of logical blocks that are requested to be read by the previous host read command). If yes, the flow proceeds to step S316; otherwise the flow goes back to step S312. At step S316, it is checked whether the start LBA of the new host read command matches one of start LBAs that the read-ahead data correspond to. If yes, the flow proceeds to step S317; otherwise the flow goes back to step S312. At step S317, since the start LBA of the new host read command matches one of LBAs that the read-ahead data correspond to, it can be confirmed that data requested by the new host read command has been read from the NV memory 120 to the read-ahead buffer 130. Therefore, a portion or all of a chunk of data would be sent to the host device 50 from the read-ahead buffer 130 (which depends on the number of logical blocks requested by the new host read command).

Accordingly, the flow proceeds to step S318, it is checked whether there is still read-ahead data remaining in the read-ahead buffer 130 and there is still logical blocks that needs to be sent. Specifically, the memory controller 110 uses a counter value "RdAhAccSctrCnt" to record a total sector count of the read-ahead data stored in the read-ahead buffer 130, and uses a counter value "RLBN" to record a sector count of data that needs to be sent to the host device 50.

If there is still read-ahead data remaining in the read-ahead buffer 130 (i.e., RdAhAccSctrCnt≠0) and there is still logical blocks that needs to be sent (i.e., RLBN≠0), the flow goes back to step S317, sending a portion or all of another chunk of data to the host device 50 from the read-ahead buffer 130. If all the read-ahead data in the read-ahead buffer 130 has been sent to the host device 50 (i.e., RdAhAccSctrCnt=0) but there is still logical blocks that needs to be sent (i.e., RLBN≠0), this means all the read-ahead data in the read-ahead buffer 130 has been sent to the host device 50 to respond to the new host read command but some data requested by the new host read command has not be read by the read-ahead operation yet. In view of this, the flow goes to step S319, where a normal read operation will be executed by the memory controller 110 to read the NV memory 120, thereby to acquire the data that is requested by the new host read command but has not been read by the read-ahead operation. On the other hand, if there is still read-ahead data remaining in the read-ahead buffer 130 (i.e., RdAhAccSctrCnt≠0) but no still logical block needs to be sent (i.e., RLBN=0), this means data requested by the new host read command has been satisfied by the read-ahead data and thus the new host read host read command has been finished. Accordingly, the flow goes to step S311, waiting for a next new host read command.

Figure 3:
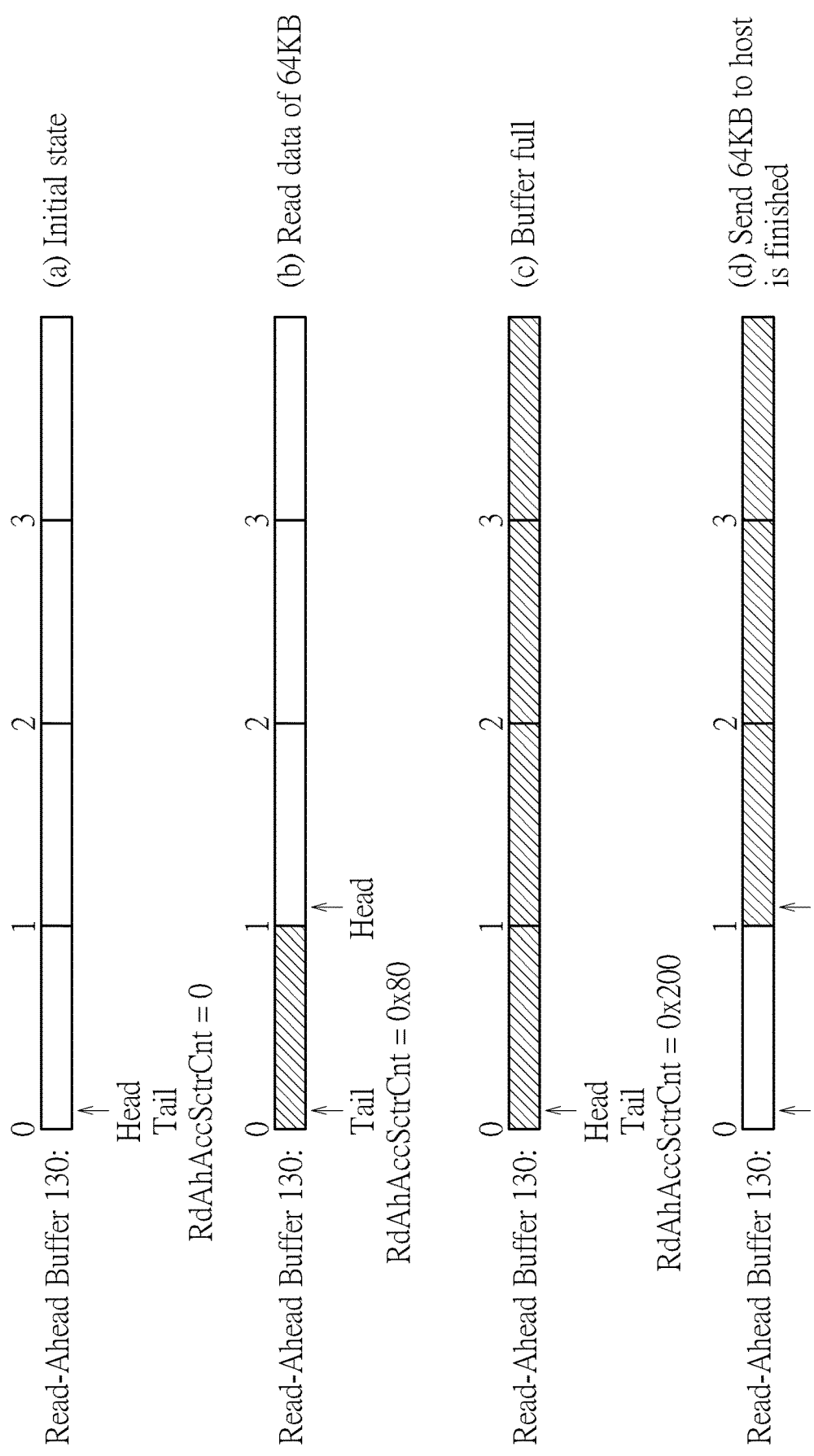
FIG. 3 illustrates how to manage read-ahead data buffering according to one embodiment of the present invention.

Please refer to FIG. 3, which illustrates how to manage the read-ahead data buffering according to one embodiment of the present invention. In one embodiment, the memory controller 110 use an index "Head", an index "Tail", the counter value "RdAhAccSctrCnt" to manage the read-ahead data buffering and recorder buffer state. The index "Head" is intended to indicate a chunk position of the read-ahead buffer 130 where a next chunk of data that will be acquired from the NV memory 120 through the read-ahead operation should be stored. The index "Tail" is intended to indicate a chunk position of the read-ahead buffer 130 where a first one portion of data that has been ready to be sent to the host device 50 is stored. The counter value "RdAhAccSctrCnt" indicates the total sector count of data stored in the read-ahead buffer 130, which reflects how much read-ahead data is still remaining in the read-ahead buffer 130. In the embodiment shown by FIG. 3, it is assumed that a chunk of data read through a single read-ahead operation is 64K bytes, and the size of the read-ahead buffer 130 is 4 times the size of the chunk of data (i.e., 4*64K bytes=256K bytes). In view of this, the index "Head" could be [0, 1, 2, 3], and the index "Tail" could be [0, 1, 2, 3] as well. Example (a) of FIG. 3 shows the initial state, where no read-ahead data is stored in the read-ahead buffer 130, and thus both of indexes "Head" and "Tail" are 0, and the counter value "RdAhAccSctrCnt" will be 0. Example (b) of FIG. 3 shows a condition where a first chunk of data is read through a read-ahead operation and stored in the read-ahead buffer 130. Therefore, the index "Head" will increase by one (, thereby to indicate a chunk position "1" of the read-ahead buffer 130 where a next chunk of data can be stored to), while the index "Tail" stays at 0 (, thereby to indicate the chunk position "0" where data that has been ready to be sent to the host device 50 is stored). Also, as a sector size being 512 Bytes, the counter value "RdAhAccSctrCnt" will be 0x80. Example (c) of FIG. 3 shows a condition where 4 chunks of data are read through 4 read-ahead operations and stored in the read-ahead buffer 130. Therefore, the index "Head" will returns to 0, while the index "Tail" also returns to 0. Moreover, the counter value "RdAhAccSctrCnt" will be 0x200 (i.e., the number of sectors of 256K bytes). Although the indexes "Head" and "Tail" in example (a) and (c) are 0 both the same, they can be distinguished by the counter value "RdAhAccSctrCnt". Example (d) of FIG. 3 shows a condition where a first one of chunks of data stored in the read-ahead buffer 130 has been sent to the host device 50. Therefore, the index "Head" stays at 0, while the index "Tail" increase by 1 (, thereby to indicate the chunk position "1" where data that has been ready to be sent to the host device 50 is stored). Moreover, the counter value "RdAhAccSctrCnt" will be reduced to 0x180 since 0x80 sectors of data has been sent to the host device 50.

Figure 4A:
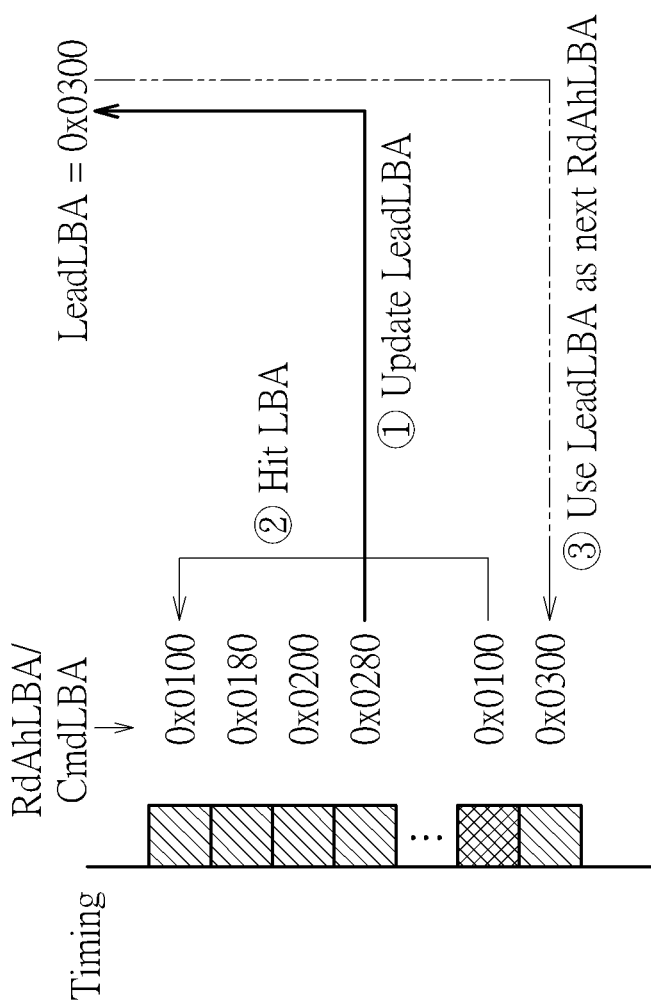
FIG. 4A and FIG. 4B illustrate how to manage start LBAs of data in different chunk positions and determine read-ahead start LBA according to one embodiment of the present invention.
Figure 4B:
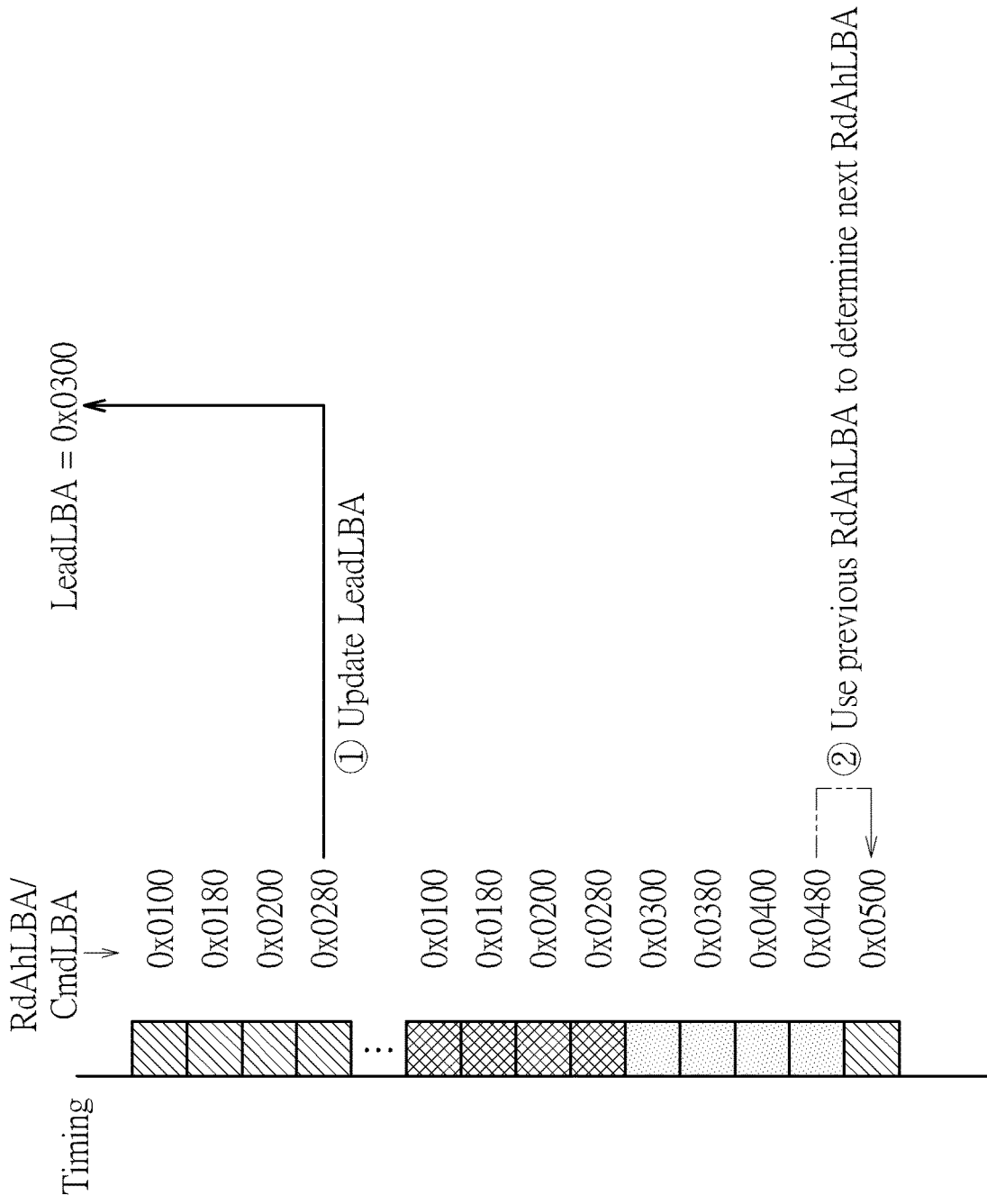

Please refer to FIG. 4A and FIG. 4B, which illustrate how to manage start LBAs of data that have been read through the read-ahead operations data in different chunk positions and determine a read-ahead start LBA for a next read-ahead operation according to one embodiment of the present invention. In this embodiment, the memory controller 110 uses an array StartLBA[i], an array AccSctrCnt[i] and a value LeadLBA for recording the start LBAs. Specifically, the array StartLBA[i] records a start LBA of data that is stored in a chunk position i of the read-ahead buffer 130. The array AccSctrCnt[i] records a sector count of data that is currently stored in a chunk position i of the read-ahead buffer 130. The value LeadLBA represent a predictive start LBA that a next read-ahead operation corresponds to.

According to start LBAs of the read-ahead data that are recorded by the array StartLBA[i], the memory controller 110 is able to determine whether a start LBA of a new host read command corresponds to one of the start LBAs of the read-ahead data. Moreover, according the value LeadLBA, the memory controller could determine a read-ahead start LBA RdAhLBA of a next read-head operation. In a condition shown by FIG. 4A, four chunks of data are read from the NV memory 120 to the read-ahead buffer 130. Start LBAs that the four chunks of the read-ahead data correspond to, are 0x0100, 0x0180, 0x0200 and 0x0280, respectively. Accordingly, the value LeadLBA will be updated as 0x300, which is determined according to a summation of a start LBA (i.e., 0x280) of a last chunk of a summation of the read-ahead data and the sector count of the last chunk of the read-ahead data (i.e., 0x080). Hence, the value LeadLBA will be 0x300. Then, a new host read command with a start LBA (CmdLBA) of 0x100 hits the start LBA 0x100 of the first chunk of the read-ahead data. Accordingly, the memory controller 110 returns the read-ahead data to the host device 50. On the other hand, as the start LBA CmdLBA of the new host read command (which is 0x100) is smaller than the value LeadLBA (which is 0x300), the memory controller 110 would determine the value LeadLBA as the read-head start LBA RdAhLBA for the next read-ahead operation since the data corresponding to those start LBAs smaller than 0x300 has been read and stored in the read-ahead buffer 130.

In a condition shown by FIG. 4B, four chunks of data are read from the NV memory 120 to the read-ahead buffer 130 through the read-ahead operations. Start LBAs that the four chunks of the read-ahead data correspond to, are 0x100, 0x180, 0x200 and 0x280, respectively. Accordingly, the value LeadLBA will be updated as 0x300, which is determined according to a summation of a start LBA (i.e., 0x280) of a last chunk of the read-ahead data and a number sector count of the last chunk of the read-ahead data (i.e., 0x080). After a period of time, the host device 50 starts to send a series of host read commands with start LBA CmdLBA of 0x0100, 0x0180, 0x200, 0x280, 0x300, 0x380, 0x400, 0x0480 (each of which requests data of 0x80 sectors). In such condition, as the value LeadLBA is smaller than a start LBA of a last host read command, the memory controller 110 would not use the value LeadLBA as the read-ahead start LBA RdAhLBA. Instead, the memory controller 110 would determine the read-ahead start LBA RdAhLBA (i.e., 0x500) according to a summation of a start LBA (i.e., 0x0480) and a sector count of data that are requested by the last host read command (i.e., 0x080).

In one embodiment, the array StartLBA[i] can be also used by the memory controller 110 determine whether a start LBA of a new host read command hits one of the start LBAs of that the read-ahead data corresponds to. Specifically, by setting i as the index "Tail", it can be obtained a start LBA of a first one portion of data that has been ready to be sent to the sent host device 50. Hence, the memory controller 110 could compare the value StartLBA[Tail] with the start LBA of the new host read command to determine whether there is a read-ahead hit. Only when there is a read-ahead hit, the memory controller 110 would respond to the new host read command by sending the read-ahead data whose start LBA matches the new host read command to the host device 50. Otherwise, the memory controller 110 would respond to the new host read command by executing a normal read operation on the NV memory 120.

Figure 5A:
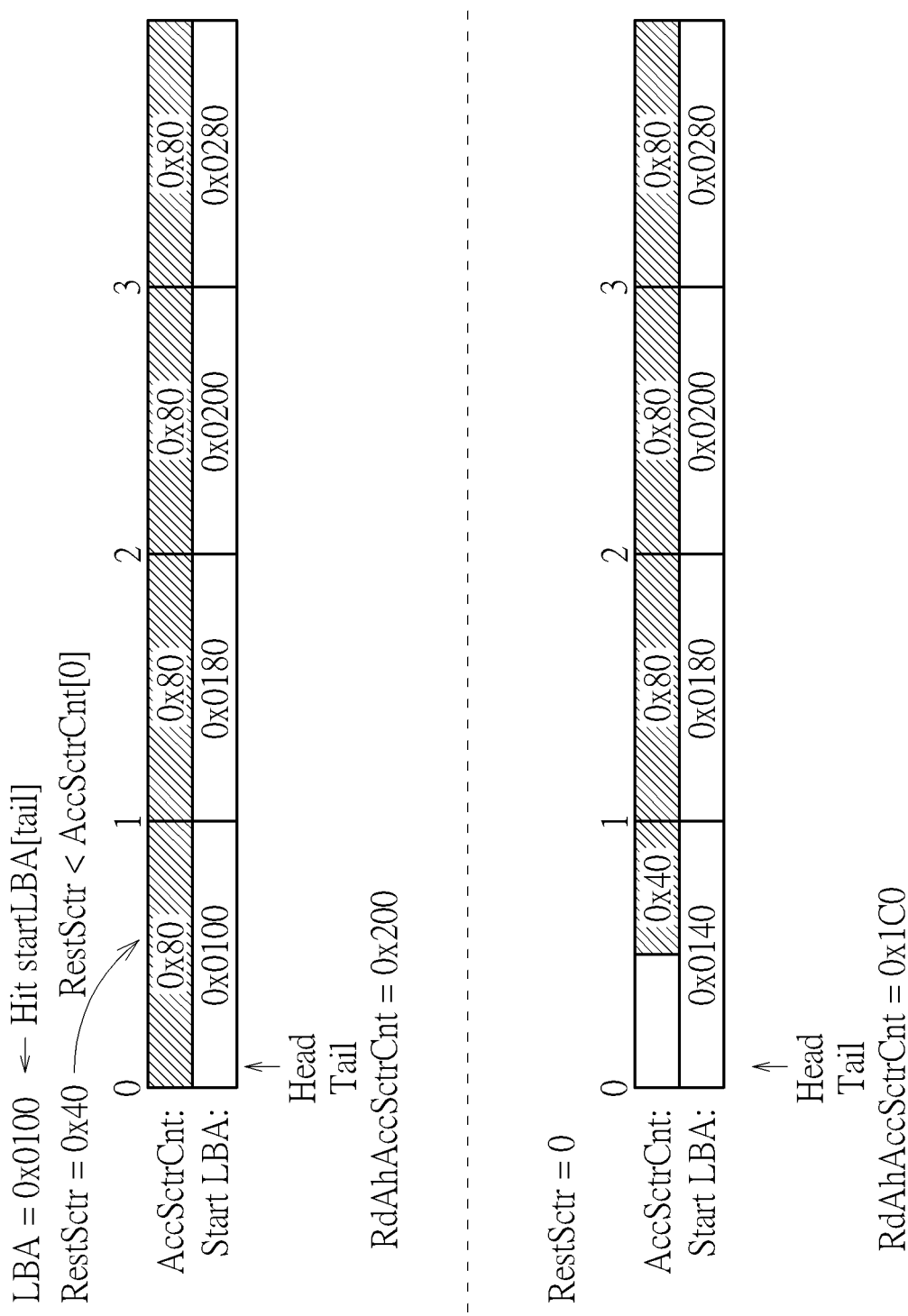
FIG. 5A and FIG. 5B illustrate how to send the read-ahead data to a host device according to one embodiment of the present invention.
Figure 5B:
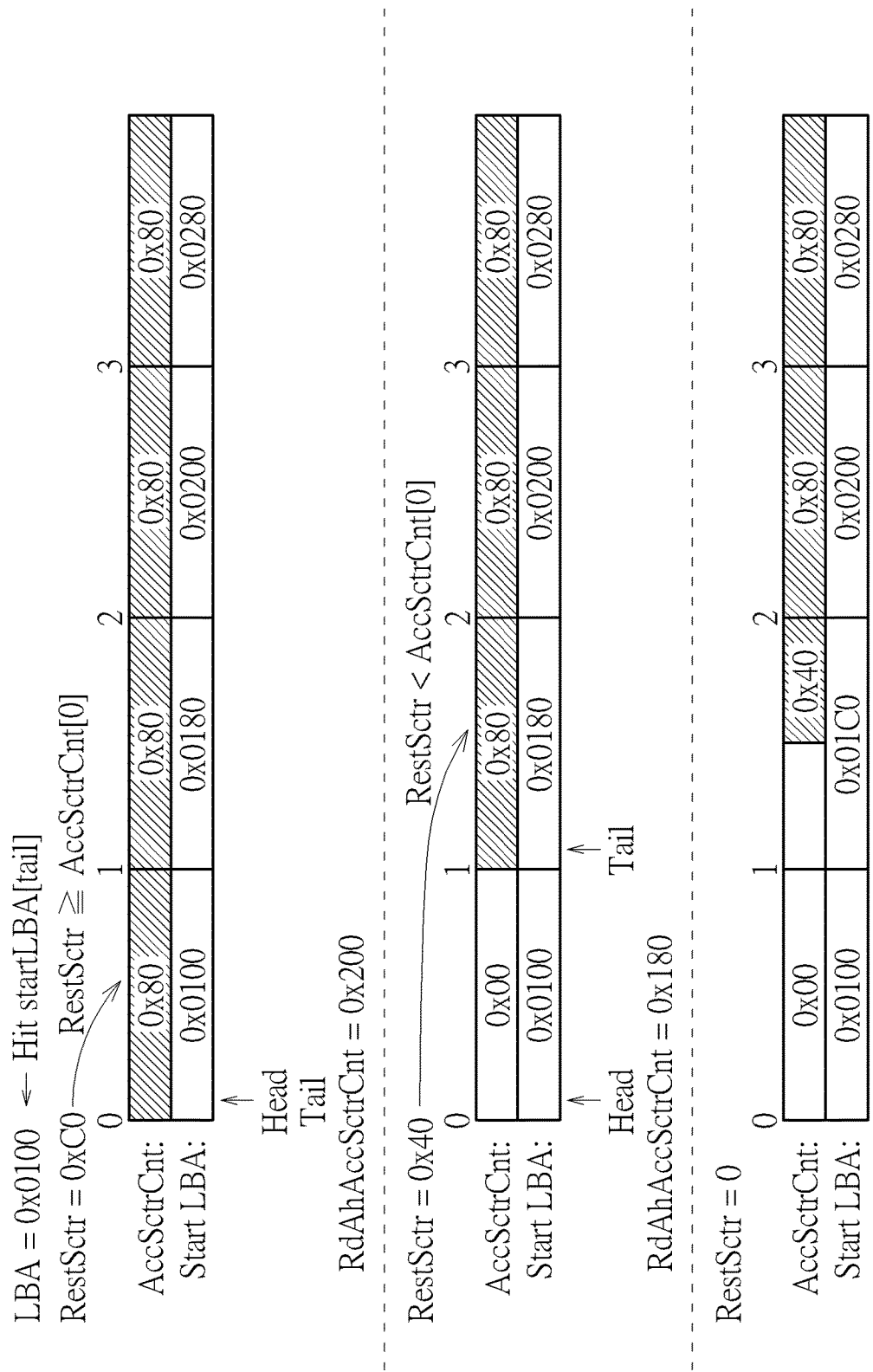

FIG. 5A and FIG. 5B further explain more examples regarding how the present invention sending the read-ahead data to the host device 50 according to one embodiment of the present invention. In the example shown by FIG. 5A, a host read command with a start LBA of 0x0100, which requests data of 0x40 sectors (i.e., NLBN=0x40) is received. On other hand, the read-ahead buffer 130 is full, and thus the index "Head" and the index "Tail" both point to the chunk position "0", and the counter value "RdAhAccSctrCnt" is 0x200. Since the start LBA of the host read command hits the value StartLBA[Tail (=0)], which is directed to a start LBA of the data stored in the chunk position "0", the memory controller 110 would respond to the host read command by sending data in the read-ahead buffer 130 to the host device 50. As the NLBN (0x40 sectors) is smaller than the value AccSctrCnt[0](0x80 sectors) in data size, only half of the chunk of data at chunk position "0" of the read-ahead buffer 130 will be sent to the host device 50. After one transaction, all the sectors requested by the host read command has been sent and thus a sector count RestSctr of the data that needs to be sent to the host device 50 will become 0 from 0x40 and the total sector count "RdAhAccSctrCnt" in the read-ahead buffer 130 is reduced to 0x1C0. After completing the host read command, both of indexes "Head" and "Tail" still points to the chunk position "0" as there is still data remaining in the chunk position "0". In addition, the value StartLBA[Tail], which is the start LBA of the data regarding index "Tail", will become 0x140 (i.e., StartLBA [Tail]+NLBN) and the value AccSctrCnt[Tail], which is the sector count of the data regarding index "Tail", will become 0x040 (i.e., AccSctrCnt[Tail]-NLBN).

In the example shown by FIG. 5B, a host read command with a start LBA of 0x0100, which requests data of 0xC0 sectors (i.e., NLBN=0xC0) is received. On other hand, the read-ahead buffer 130 is full, and thus the index "Head" and the index "Tail" both point to the chunk position "0", and the counter value "RdAhAccSctrCnt" is 0x200. Since the start LBA of the host read command hits the value of the array StartLBA[Tail (=0)], which indicates a start LBA of the data stored in the chunk position "0", the memory controller 110 would respond to the host read command by sending data in the read-ahead buffer 130 to the host device 50. As the NLBN (0xC0 sectors) is larger than AccSctrCnt[0] (0x80 sectors) in data size, a first chunk of data in chunk position "0" and half of a second chunk of data in chunk position "1" of the read-ahead buffer 130 will be sent to the host device 50. After a first transaction, all the sectors of the first chunk of data has been sent to host device 50 and thus a sector count RestSctr of the data that needs to be sent to the host device 50 will become 0x40 from 0xC0. Accordingly, the total sector count "RdAhAccSctrCnt" in the read-ahead buffer 130 is reduced to 0x180. At the moment, as all the data of the first chunk of data at chunk position "0" has been sent, the index "Tail" will increase by 1 to point to chunk position "1", wherein a second chunk of data at chunk position "1" becomes a first portion of data that has been ready to be sent to the host device 50. In addition, the index "Head" stays at chunk position "0" and the value StartLBA [Tail], which is the start LBA of the data regarding index "Tail", will become 0x180 (i.e., StartLBA[1]=0x0180).

After a second transaction, half of the sectors of the chunk of data at chunk position "1" has been sent to the host device 50 and thus the sector count RestSctr that needs to be sent to the host device 50 will become 0 from 0x40 and the total sector count "RdAhAccSctrCnt" in the read-ahead buffer 130 is reduced to 0x100. After completing the host read command, the index "Tail" points to chunk position "1" since there are still data remaining in the chunk position "1", while the index "Head" points to chunk position "0". In addition, the value StartLBA [Tail(=1)], which is the start LBA of the data regarding index "Tail", will become 0x1C0 and the value AccSctrCnt[Tail], which is the sector count of the data regarding index "Tail", will become 0x040.

Figure 6:
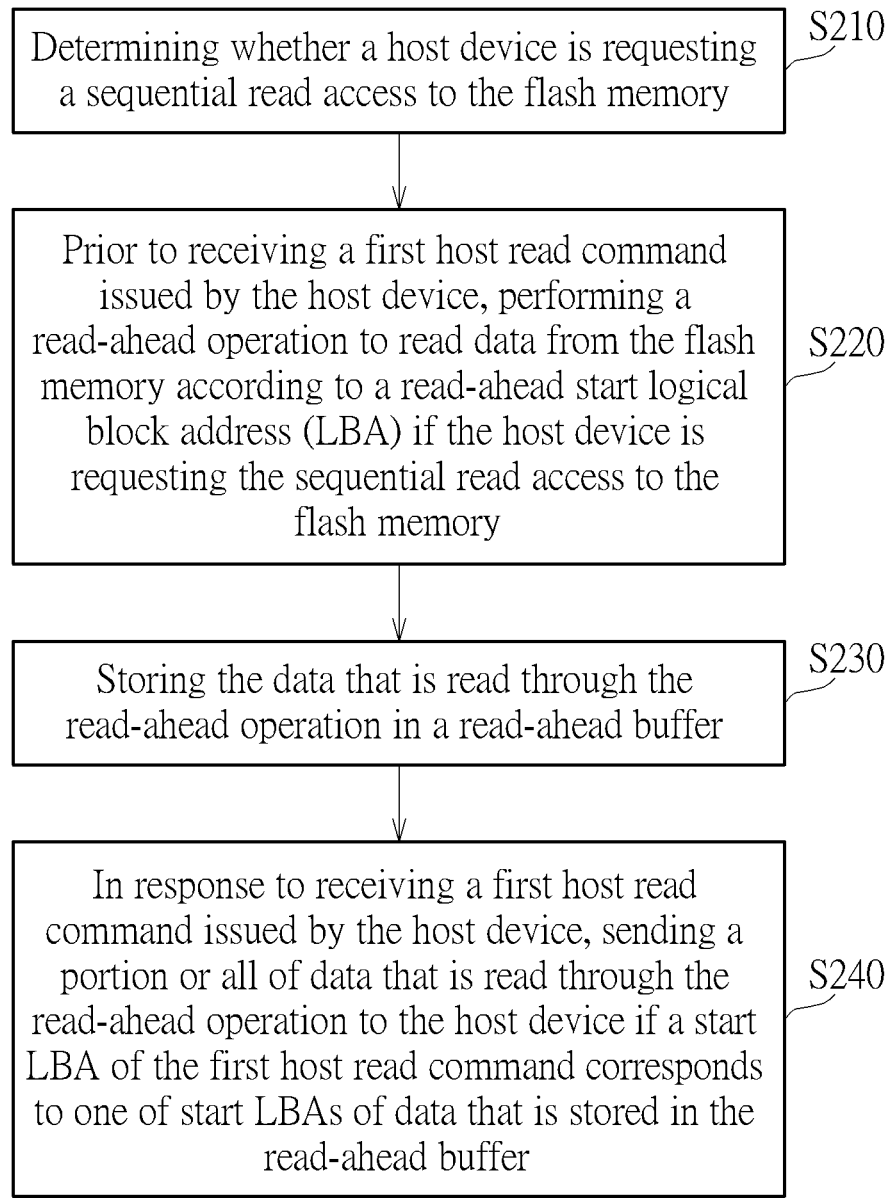
FIG. 6 illustrates a method of reading data from a flash memory according to one embodiment of the present invention.

FIG. 6 illustrates a method of read data from a flash memory. As shown in the figure, the method of the present invention includes the following simplified flow:

Step S210: determining whether a host device is requesting a sequential read access to the flash memory;

Step S220: prior to receiving a first host read command issued by the host device, performing a read-ahead operation to read data from the flash memory according to a read-ahead start logical block address (LBA) if the host device is requesting the sequential read access to the flash memory;

Step S230: storing the data that is read through the read-ahead operation in a read-ahead buffer;

Step S240: in response to receiving a first host read command issued by the host device, sending a portion or all of data that is read through the read-ahead operation to the host device if a start LBA of the first host read command corresponds to one of start LBAs of data that is stored in the read-ahead buffer.

Since principles and specific details of the foregoing steps have been explained in detail through the above embodiments, further descriptions will not be repeated here. It should be noted that the above flow may be possible, by adding other extra steps or making appropriate modifications and adjustments, to better improve flexibility and further improve read performance of flash memory access. Furthermore, all the operations set forth in the above embodiments can be implemented by the memory controller 110 shown in FIG. 1.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reading data from a flash memory, comprising:
   determining whether a host device is requesting a sequential read access to the flash memory;
   prior to receiving a first host read command issued by the host device, performing a read-ahead operation to read data from the flash memory according to a read-ahead start logical block address (LBA) if the host device is requesting the sequential read access to the flash memory;
   storing the data that is read through the read-ahead operation in a read-ahead buffer; and
   in response to receiving the first host read command issued by the host device, sending a portion or all of data that is read through the read-ahead operation to the host device if a start LBA of the first host read command corresponds to one of start LBAs of data that is stored in the read-ahead buffer;
   wherein the method further comprises:
   determining a predictive start LBA according to a start LBA of and a sector count of data stored in a last chunk position of the read-ahead buffer;
   determining the read-ahead start LBA according to the predictive LBA if a summation of a start LBA of a second host read command and a number of logical bocks that are requested by the second host read command is smaller than the predictive start LBA; and
   determining the read-ahead start LBA according to the summation of the start LBA of the second host read command and the number of logical bocks that are requested by the second host read command if the summation of the start LBA of the second host read command and the number of logical bocks that are requested by the second host read command is greater than the predictive start LBA;
   wherein the second host read command is prior to the first host read command.

2. The method of claim 1, the step of performing the read-ahead operation to read data from the flash memory comprises:
   performing the read-ahead operation to read a chunk of data from the flash memory and storing the chunk of data to the read-ahead buffer, wherein a size of the chunk of data is identical to a data amount that is obtained by performing one multi-plane read operation on a flash memory unit of the flash memory.

3. The method of claim 1, further comprising:
   recording a start LBA value for each data that is stored in a chunk position of the read-ahead buffer to indicate a start LBA of each data in the read-ahead data buffer; and
   recording a sector count value for each data that is stored in a chunk position of the read-ahead buffer to indicate a sector count of each data in the read-ahead buffer.

4. The method of claim 3, further comprising:
   determining whether or not to sending the data that is stored in the read-ahead buffer in response to receiving the first host read command; and
   sending at least one portion of data stored in a first chunk position of the read-ahead buffer if the start LBA of the data stored in the first chunk position matches the start LBA of the first host read command.

5. The method of claim 4, further comprising:
   modifying the start LBA value of the data that is stored in the first chunk position of the read-ahead buffer according to a summation of the start LBA value of the data stored in the first chunk position and a number of logical blocks that are requested by the first host read command in response to a determination that the number of logical blocks that are requested by the first host read command is smaller than a sector count of the data in the first chunk position in data size; and
   modifying the sector count value of the data that is stored in the first chunk according to a difference between the sector count value of the data stored in the first chunk position and the number of logical blocks that are requested by the first host read command in response to a determination that the number of logical blocks that are requested by the first host read command is smaller than the sector count of the data in the first chunk position in data size.

6. A memory controller for use in a flash memory to control the flash memory and read data from the flash memory, comprising:
   a storage unit, arranged to store information and program codes;
   a processing unit, operable to execute the program codes to be arranged to:
   determine whether a host device is requesting a sequential read access to the flash memory;
   prior to receiving a first host read command issued by the host device, perform a read-ahead operation to read data from the flash memory according to a read-ahead start logical block address (LBA) if the host device is requesting the sequential read access to the flash memory;
   store the data that is read through the read-ahead operation in a read-ahead buffer; and
   in response to receiving the first host read command issued by the host device, send a portion or all of data that is read through the read-ahead operation to the host device if a start LBA of the first host read command corresponds to one of start LBAs of data that is stored in the read-ahead buffer;

wherein the processing unit is further arranged to determine a predictive start LBA according to a start LBA of and a sector count of data stored in a last chunk position of the read-ahead buffer; determine the read-ahead start LBA according to the predictive LBA if a summation of a start LBA of a second host read command and a number of logical bocks that are requested by the second host read command is smaller than the predictive start LBA; and determine the read-ahead start LBA according to the summation of the start LBA of the second host read command and the number of logical bocks that are requested by the second host read command if the summation of the start LBA of the second host read command and the number of logical bocks that are requested by the second host read command is greater than the predictive start LBA; and wherein the second host read command is prior to the first host read command.

7. The memory controller of claim 6, wherein processing unit is arranged to:
perform the read-ahead operation to read a chunk of data from the flash memory and storing the chunk of data to the read-ahead buffer, wherein a size of the chunk of data is identical to a data amount that is obtained by performing one multi-plane read operation on a flash memory unit of the flash memory.

8. The memory controller of claim 6, wherein processing unit is arranged to:
record a start LBA value for each data that is stored in a chunk position of the read-ahead buffer to indicate a start LBA of each data in the read-ahead buffer; and
record a sector count value for each data that is stored in a chunk position of the read-ahead buffer to indicate a sector count of each data in the read-ahead buffer.

9. The memory controller of claim 8, wherein processing unit is arranged to:
determine whether or not to sending the data that is stored in the read-ahead buffer in response to receiving the first host read command; and
send at least one portion of data stored in a first chunk position of the read-ahead buffer if the start LBA of the data stored in the first chunk position matches the start LBA of the first host read command.

10. The memory controller of claim 9, wherein processing unit is arranged to:
modify the start LBA value of the data that is stored in the first chunk position of the read-ahead buffer according to a summation of the start LBA value of the data stored in the first chunk position and a number of logical blocks that are requested by the first host read command if the number of logical blocks that are requested by the first host read command is smaller than a sector count of the data in the first chunk position in data size; and
modify the sector count value of the data that is stored in the first chunk according to a difference between the sector count value of the data stored in the first chunk position and the number of logical blocks that are requested by the first host read command if the number of logical blocks that are requested by the first host read command is smaller than the sector count of the data in the first chunk position in data size.

11. A storage system, comprising:
a flash memory; and
a memory controller for use in a flash memory to control the flash memory and read data from the flash memory, the controller arranged to:
determine whether a host device is requesting a sequential read access to the flash memory;
prior to receiving a first host read command issued by the host device, perform a read-ahead operation to read data from the flash memory according to a read-ahead start logical block address (LBA) if the host device is requesting the sequential read access to the flash memory;
store the data that is read through the read-ahead operation in a read-ahead buffer; and
in response to receiving the first host read command issued by the host device, send a portion or all of data that is read through the read-ahead operation to the host device if a start LBA of the first host read command corresponds to one of start LBAs of data that is stored in the read-ahead buffer;
wherein the memory controller is further arranged to determine a predictive start LBA according to a start LBA of and a sector count of data stored in a last chunk position of the read-ahead buffer; determine the read-ahead start LBA according to the predictive LBA if a summation of a start LBA of a second host read command and a number of logical bocks that are requested by the second host read command is smaller than the predictive start LBA; and determine the read-ahead start LBA according to the summation of the start LBA of the second host read command and the number of logical bocks that are requested by the second host read command if the summation of the start LBA of the second host read command and the number of logical bocks that are requested by the second host read command is greater than the predictive start LBA; and wherein the second host read command is prior to the first host read command.

* * * * *